United States Patent
Kim et al.

(10) Patent No.: US 10,666,930 B2
(45) Date of Patent: May 26, 2020

(54) FULL PARALLAX MULTI-FOCUS THREE-DIMENSIONAL DISPLAY

(71) Applicant: KOREA INSTITUTE OF SCIENCE AND TECHNOLOGY, Seoul (KR)

(72) Inventors: Sungkyu Kim, Seoul (KR); Soongi Park, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 101 days.

(21) Appl. No.: 16/040,707

(22) Filed: Jul. 20, 2018

(65) Prior Publication Data

US 2019/0068958 A1   Feb. 28, 2019

(30) Foreign Application Priority Data

Aug. 23, 2017   (KR) .................. 10-2017-0106738

(51) Int. Cl.
*H04N 13/31* (2018.01)
*H04N 13/322* (2018.01)
*H04N 13/307* (2018.01)
*H04N 13/344* (2018.01)

(52) U.S. Cl.
CPC ........... *H04N 13/31* (2018.05); *H04N 13/307* (2018.05); *H04N 13/322* (2018.05); *H04N 13/344* (2018.05)

(58) Field of Classification Search
CPC .... H04N 13/31; H04N 13/322; H04N 13/344; H04N 13/307

USPC ......................................................... 348/54
See application file for complete search history.

(56) References Cited

FOREIGN PATENT DOCUMENTS

| JP | 09-236880 A | 9/1997 | |
|---|---|---|---|
| JP | 2009-294509 A | 12/2009 | |
| KR | 10-2005-0072179 A | 7/2005 | |
| KR | 100617396 B1 * | 8/2006 | ............. H04N 13/31 |
| KR | 10-1059763 B1 | 8/2011 | |

OTHER PUBLICATIONS

KR100617396 Machine Translation (Year: 2006).*
Akimasa Yuuki et al., "A new Maxwellian view display for trouble-free accommodation", Journal of the Society for Information Display, Nov. 2012, pp. 581-588, vol. 20, No. 10.
Jisoo Hong et al., "Integral floating display systems for augmented reality", Applied Optics, Jun. 20, 2012, pp. 4201-4209, vol. 51, No. 18.
Douglas Lanman et al., "Near-Eye Light Field Displays", ACM Transactions on Graphics, Nov. 2013, pp. 1-10, vol. 32, No. 6.

* cited by examiner

*Primary Examiner* — Nguyen T Truong
(74) *Attorney, Agent, or Firm* — Rabin & Berdo, P.C.

(57) ABSTRACT

Disclosed is a full parallax multi-focus three-dimensional (3D) display including: a parallax image provider configured to form two-dimensionally arranged parallax images spatially divided to provide at least two parallax images; and a parallax image convergence unit configured to converge the two-dimensionally arranged parallax images provided by the parallax image provider around a pupil of an eyeball.

11 Claims, 13 Drawing Sheets

FULL PARALLAX MULTI-FOCUS THREE-DIMENSIONAL DISPLAY

CROSS-REFERENCE TO RELATED APPLICATION

This application claims priority to and the benefit of Korean Patent Application No. 2017-0106738, filed on Aug. 23, 2017, the disclosure of which is incorporated herein by reference in its entirety.

BACKGROUND

1. Field of the Invention

The present invention relates to a three-dimensional (3D) display, and more specifically, to a full parallax multi-focus 3D display.

2. Discussion of Related Art

Conventional commercial augmented reality or virtual reality head mounted displays (HMD) may provide a stereoscopic image seen due to a binocular parallax, but may not provide eye adjustment information, and thus it causes a problem of popularization because of fundamental problems such as eye fatigue and blurred image due to depth of view. Even the Microsoft HoloLens, which is one of the top commercial augmented reality displays, is not recommended to display a three-dimensional (3D) object within 1 meter because of providing a poor experience. However, in order to provide interaction with 3D images within a range of human hands (30 to 80 cm), support for a method of focus adjustment for the 3D image is essential.

Korean Patent Laid-Open No. 10-2004-0000469 discloses a 3D image display device which provides two or more parallax images within a minimum diameter of a pupil of an eye. However, since the 3D image display device has to include a parallax image providing unit having a laser source, an optical diffuser, and a light modulator, and a parallax image convergence unit including pinholes and lenses in order to provide at least two parallax images in the pupil, the 3D image display device has problems in size and volume constraints. In addition, Korean Patent Laid-Open No. 10-2009-0087375 discloses a 3D image display that satisfies a focus adjustment function including conditions by arranging light sources in vertical, horizontal, and diagonal directions using a laser source device. However, there is a problem in commercialization because a projection optical system, which is basically necessary for enlarging an image and adjusting a focus, is large.

In addition, a method of forming a Maxwell view in which images are directly projected onto a retina using a combination of micro pinholes and a lens array (Yuuki et al., "A new Maxwellian view display for trouble-free accommodation," Journal of the Society for Information Display, vol. 20, no. 10, pp. 581-588, November 2012). However, the method is a technique for expanding a depth of focus of an observed image rather than forming multifocal images using the combination of the lens array and the pinholes, and views overlap using 7×7 pinholes per lens to expand an observed zone. Due to this structure, since resolution of the observed image is proportional to the number of lenses in the lens array, there is a limit in forming ultra-high resolution images.

In addition, an integrated augmented reality imaging system using a lens array and a translucent convex mirror was proposed as a related art (Hong et al., "Integral floating display systems for augmented reality," Appl. Opt., vol. 51, No. 18, pp. 4201-4209, June 2012). However, since an imaging position of a provided image is in a virtual image zone, and a 3D image is provided using an integrated imaging method, there are problems in that a depth expression range of the formed image is highly dependent on a pixel size of a basic display and resolution thereof is drastically reduced according to a display depth of the image.

In addition, Lanman et al. proposed a light-field display (the same as an integrated imaging system) in a form of glasses in 2013 (D. Lanman and D. Luebke, "Near-eye light field displays," ACM Trans. Graph. 6, pp. 1-10, November 2013). Required conditions of a system when an existing system is applied to a glasses type display are analyzed to draw requirements, image depth expression characteristics, and resolution expression characteristics. However, this method is also based on a principle of making a 3D image in a virtual image zone using a lens array like Hong's method.

PRIOR ART DOCUMENT

Patent Document (Patent Document 1) Korean Patent Laid-Open No. 10-2004-0000469
(Patent Document 2) Korean Patent Laid-Open No. 10-2009-0087375

Non-Patent Document (Non-Patent Document 1) Yuuki et al., "A new Maxwellian view display for trouble-free accommodation," Journal of the Society for Information Display, vol. 20, no. 10, pp. 581-588, November 2012.
(Non-Patent Document 2) Hong et al., "Integral floating display systems for augmented reality," Appl. Opt., vol. 51, no. 18, pp. 4201-4209, June 2012.
(Non-Patent Document 3) D. Lanman and D. Luebke, "Near-eye light field displays," ACM Trans. Graph., vol. 32, no. 6, pp. 1-10, November 2013.

SUMMARY OF THE INVENTION

The present invention is directed to a full parallax three-dimensional (3D) display provided with a focus adjustment function and having a volume reduced to comply with a size of a conventional head mounted display (HMD) by using a two-dimensional (2D) array of lenses or pinholes in an image providing unit.

A first aspect of the present invention provides a three-dimensional display comprising: a parallax image provider configured to form two-dimensionally arranged parallax images spatially divided to provide at least two parallax images; and a parallax image convergence unit configured to converge the two-dimensionally arranged parallax images provided by the parallax image provider around a pupil of an eyeball.

The parallax image provider may include: an image providing unit configured to provide the at least two parallax images; and an optical device array configured to spatially divide the parallax images provided by the image providing unit to form two-dimensionally arranged parallax images.

The parallax image provider may further include: an additional image providing unit arrayed two-dimensionally and configured to provide the at least two parallax images; an additional optical device array configured to spatially divide the parallax images provided by the additional image providing unit to form two-dimensionally arranged parallax images; and a half mirror configured to combine the parallax images provided by the image providing unit and formed through the optical device array and the parallax images provided by the additional image providing unit and formed through the additional optical device array, wherein the number of views of the parallax images, which are converged around the pupil of the eyeball, increases by parallax images combined by the half mirror.

The parallax image provider may include the optical device array having two or more pinhole arrays to spatially divide the parallax images provided by the image providing unit, and positions of the pinholes change over time using the two or more pinhole arrays to increase the number of views of the parallax images converged around the pupil of the eyeball.

In the parallax image provider, the optical device array may be formed to be greater than the parallax images provided by the image providing unit to expand the parallax images transmitted through a sub-viewing zone according to a position of the pupil of the eyeball detected by a pupil position tracing sensor configured to detect the position of the pupil of the eyeball.

The optical device array may include a pinhole array which is two-dimensionally arrayed, a lens array which is two-dimensionally arrayed, or a combination of the pinhole array and the lens array, wherein the parallax images provided by the image providing unit may correspond one-to-one to pinholes of the pinhole array or lenses of the lens array.

The pinhole of the pinhole array may form a two-dimensional image of one view and a diameter of the pinhole may be 0.05 mm or more.

The image providing unit may include a self-luminous display panel corresponding to an organic light-emitting diode (OLED) or micro light-emitting diode (LED), or a passive display panel corresponding to a liquid crystal display (LCD), a liquid crystal on silicon (LCoS), or a digital micro-mirror device (DMD).

The parallax image convergence unit may include: a sight adjustment opening configured to adjust a sight such that the parallax images are converged around the pupil of the eyeball; and a convex lens configured to adjust a distance between the parallax images converged around the pupil of the eyeball.

The parallax image provider may include: a pupil position tracing sensor configured to detect a position of the pupil of the eyeball; and a diffraction optical device disposed in front of the convex lens and configured to diffract the parallax images provided by the image providing unit according to the position of the pupil of the eyeball detected by the pupil position tracing sensor to expand the parallax images.

In the optical device array, a distance between unit optical devices, a distance between the image providing unit and the convex lens, and a distance between the convex lens and the eyeball may be adjusted such that a distance between views formed around the pupil is less than a diameter of the pupil.

The parallax image convergence unit may include a first convex lens, a sight adjustment opening, and a second convex lens, which are sequentially disposed such that the parallax images transmitted through the optical device array are directly projected on the eyeball and distances between the first convex lens, the sight adjustment opening, and the second convex lens correspond to focal distances of the first and second convex lenses.

The parallax image convergence unit may include: a sight adjustment opening configured to adjust a sight to converge the parallax images around the pupil of the eyeball; and a concave or translucent concave mirror configured to adjust a distance between the parallax images converged around the pupil of the eyeball.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
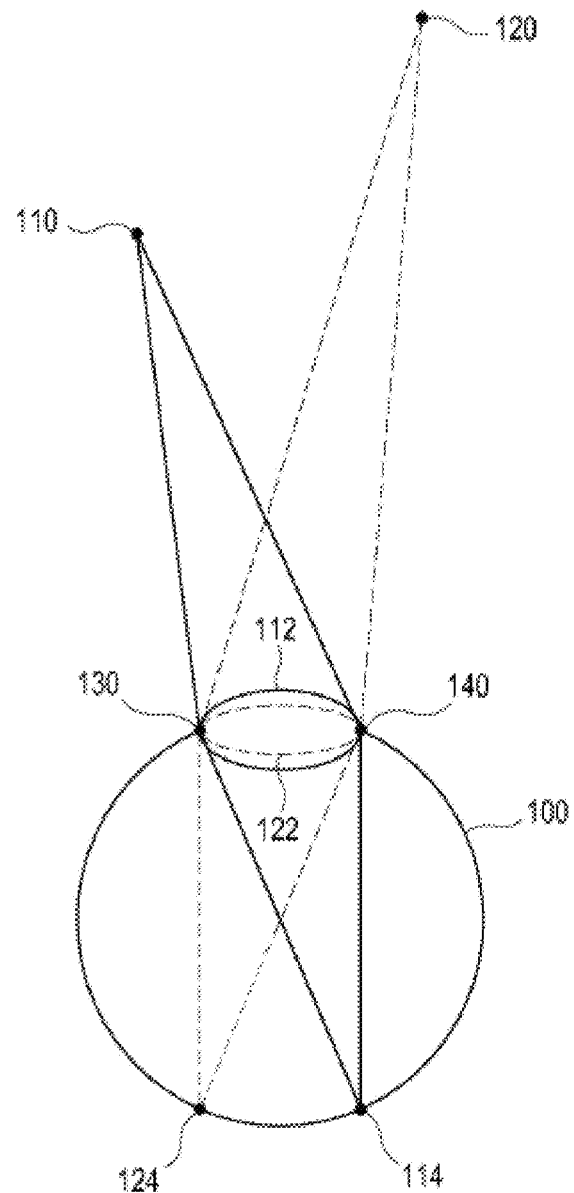
FIG. 1 is a view for describing a principle in which a three-dimensional (3D) display according to the present invention satisfies a focusing function of an eye.

Advantages and features of the present invention and methods of achieving the same should be clearly understood with reference to the accompanying drawings and the following detailed embodiments. However, the present invention is not limited to the embodiments to be disclosed and may be implemented in various forms. The embodiments are provided in order to fully explain the present invention and fully explain the scope of the present invention for those skilled in the art. The scope of the present invention is defined by the appended claims. Like reference numerals denote like elements throughout the specification. The term "and/or" refers to all combinations including one or more of mentioned items.

Although the terms first, second, etc. may be used herein in reference to various elements, components, and/or sections, such elements, components, and/or sections are not to be construed as limited by these terms. These terms are only used to distinguish one element, component, and/or section from another. Accordingly, a first element, a first component, or a first section mentioned below may also be a second element, a second component, or a second section according to the spirit of the present invention.

The terms used herein are provided to only describe the embodiments of the present invention and not for the purpose of limitation. Unless the context clearly indicates otherwise, singular forms include plural forms. It should be understood that the terms "comprise" and "comprising," when used herein, specify the stated components, steps, operations, and/or elements, but do not preclude the presence or addition of one or more other components, steps, operations, and/or elements.

Unless otherwise defined, all terms (including technical and scientific terms) used herein can be used as is customary in the art to which this invention belongs. Also, it should be further understood that terms, such as those defined in commonly used dictionaries, are not to be interpreted in an idealized or overly formal sense unless expressly so defined herein.

When it is determined that detailed descriptions of known technology related to the present invention unnecessarily obscure the subject matter of the invention in the description of the embodiment of the invention, the detailed descriptions thereof will be omitted. Some terms described below are defined in consideration of functions in the invention, and meanings thereof may vary depending on, for example, a user or operator's intentions or customs. Therefore, the meanings of terms should be interpreted on the basis of the scope throughout this specification.

FIG. 1 is a view for describing a principle in which a three-dimensional (3D) display according to the present invention satisfies a focusing function of an eye.

An observer can adjust a thickness of an eye lens to focus on a point light source at a depth to be observed, and accordingly an image is formed on a retina of eyeball 100 of the observer. For example, in a case in which the observer focuses on a point light source 110, a thickness of the eye lens 112 is adjusted, and image 114 of the point light source 110 is formed on the retina. In addition, in a case in which the observer focuses on a point light source 120, the thickness of the eye lens 122 is adjusted, and image 124 of the point light source 120 is formed on the retina. In a case in which any one of the point light sources 110 and 120 is focused, the remaining point light source 110 or 120 at a different depth is blurred. Accordingly, when the display converges the parallax images at convergence positions between 130 and 140 in front of a pupil of the observer, focusing can be adjusted. Although at least two parallax images minimally needed to adjust focuses are illustrated in FIG. 1, two or more parallax images may also be provided. As the number of parallax images increases, an image provided to the observer has a more natural 3D effect.

Figure 2:
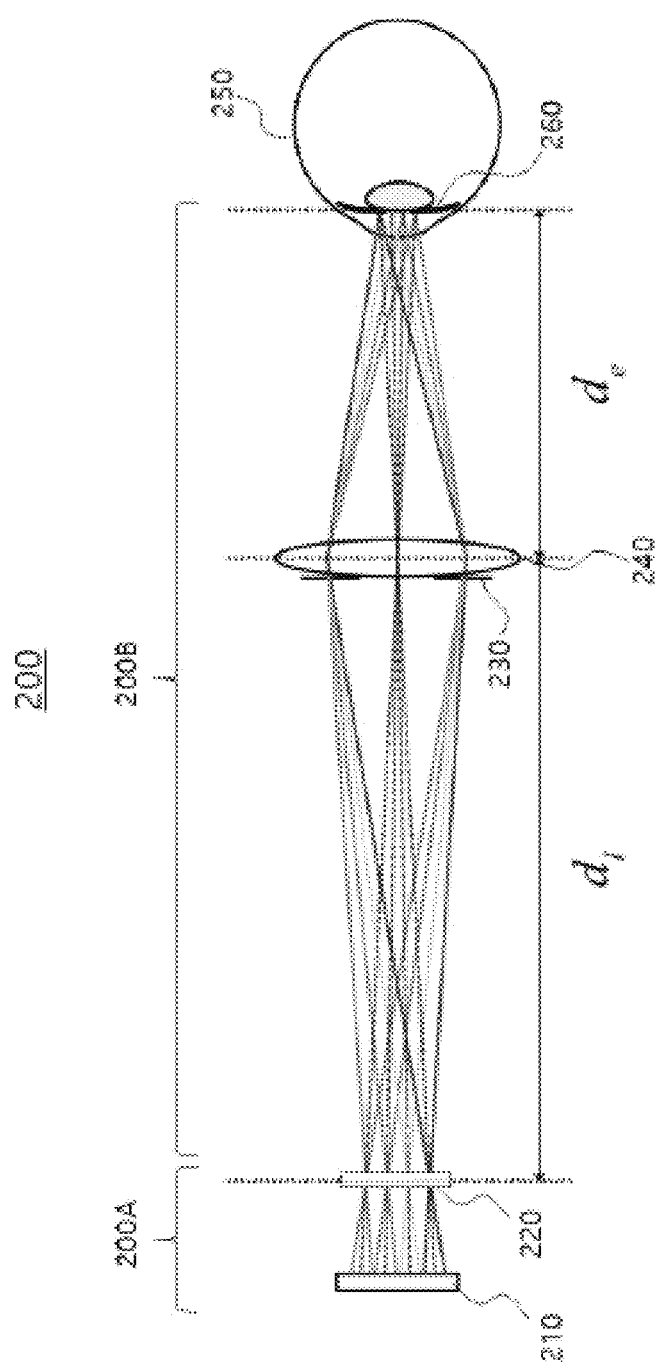
FIG. 2 is a configuration view illustrating the 3D display according to an exemplary embodiment of the present invention.

FIG. 2 is a configuration view illustrating the 3D display according to the exemplary embodiment of the present invention.

Referring to FIG. 2, a 3D display 200 includes a parallax image provider 200A configured to form two-dimensionally arranged parallax images spatially divided to provide at least two parallax images, and a parallax image convergence unit 200B configured to converge the two-dimensionally arranged parallax images provided by the parallax image provider 200A around a pupil 260 of an eyeball 250. Preferably, the parallax image provider 200A may include an image providing unit 210 configured to provide at least two parallax images, and an optical device array 220 configured to spatially divide parallax images provided from the image providing unit 210 to form two-dimensionally arranged parallax images.

The image providing unit 210 may be a self-luminous micro display panel corresponding to an organic light-emitting diode (OLED) or micro light-emitting diode (LED), or a passive display panel corresponding to a liquid crystal display (LCD), a liquid crystal on silicon (LCoS), or a digital micro-mirror device (DMD).

Figure 3A:
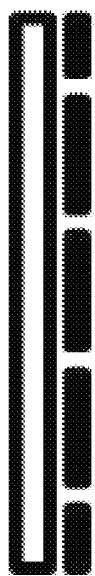
FIG. 3A to 3E are views for describing an example of an optical device array.
Figure 3B:
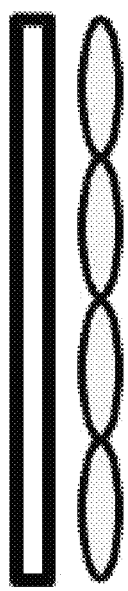
Figure 3C:
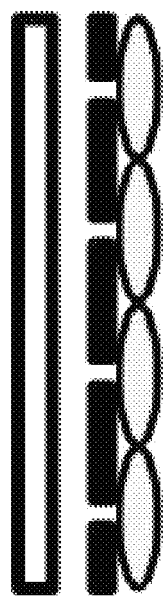
Figure 3D:
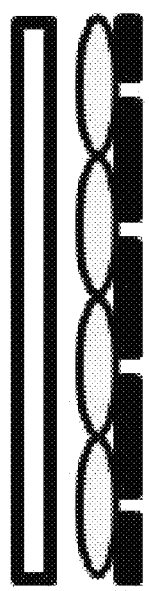
Figure 3E:
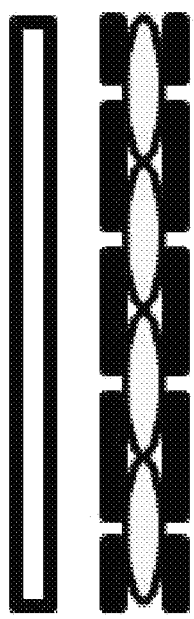

The optical device array 220 is configured to spatially divide parallax images and may include a pinhole array or lens array. Preferably, referring to FIG. 3A to 3E, the optical device array 220 may include only a pinhole array as described in FIG. 3A, include only a lens array as described in FIG. 3B, include a pinhole array and a lens array as described in FIGS. 3C and 3D, or include a lens array interposed between pinhole arrays. Here, as illustrated in FIGS. 3C, 3D, and 3E, in a case in which all of the pinhole array and the lens array are included in the optical device array 220, incidence optical properties on the eyeball 250 can be improved.

Figure 4A:
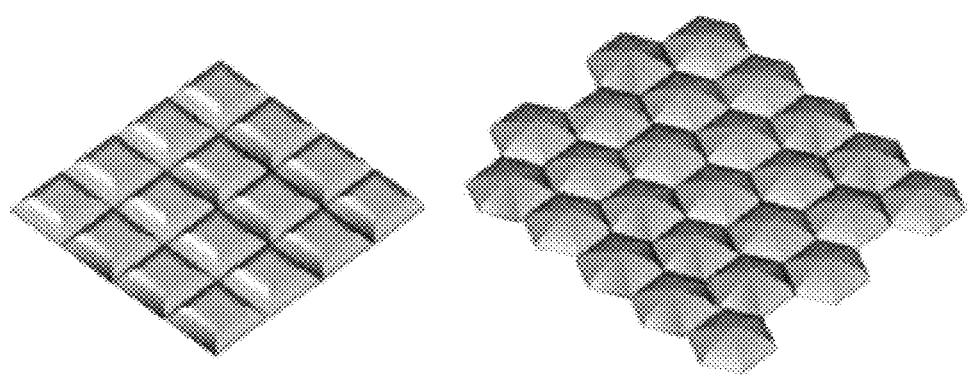
FIGS. 4A and 4B are views for describing examples of a pinhole array and a lens array.
Figure 4B:
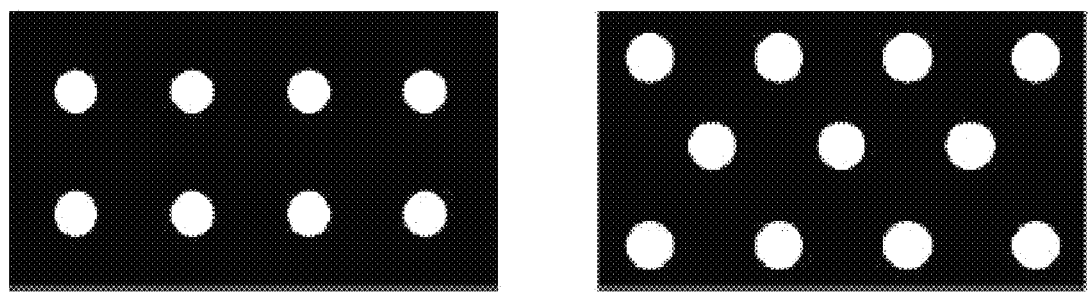

Preferably, the pinhole array serves to adjust a width of light passing through pinholes using open holes which are two-dimensionally arranged, and may include pinholes in which the number thereof corresponds to parallax images provided by the image providing unit 210. For example, referring to FIGS. 4A and 4B, the lens array may be a rectangular or hexagonal lens array illustrated in FIG. 4A. The pinhole array may be a rectangular or hexagonal pinhole array as illustrated in FIG. 4B. Here, a distance between lenses of the lens array and a distance between pinholes of the pinhole array may be adjusted according to a distance between the image providing unit 210 and a convex lens 240 which will be described below, and a distance between the convex lens 240 and the eyeball 250. In addition, each of the pinholes of the pinhole array and the lenses of the lens array may form a two-dimensional (2D) image of one view to correspond one-to-one to a parallax image provided by the image providing unit 210. In addition, a diameter of the pinhole of the pinhole array may be 0.05 mm or more to reduce blurriness of an image due to a diffraction phenomenon.

Preferably, the parallax image convergence unit 200B may include a sight adjustment opening 230 configured to adjust a sight to converge parallax images provided by the image providing unit 210 around a pupil 260 of the eyeball 250, and a convex lens 240 configured to adjust a distance between the parallax images converged around the pupil 260 of the eyeball 250 within a diameter of the pupil. Generally, a width of the pupil of the eyeball ranges from 2 mm to 8 mm according to surrounding brightness. Here, the convex lens 240 may be substituted with a spherical reflector or concave mirror.

Preferably, a distance d1 between the convex lens 240 and the optical device array 220 and a distance de between the convex lens 240 and the pupil 260 may be adjusted to satisfy conditions in which distances between views of a group of views formed around the pupil 260 are less than the diameter of the pupil.

Accordingly, according to the 3D display 200 according to the present invention, since images provided by the image providing unit 210, having horizontal parallax and vertical parallax, and passing through the optical device array 220, are converged around the pupil 260 of the eyeball 250 through the sight adjustment opening 230 and the convex lens 240, full parallax images may be properly formed.

Hereinafter, embodiments of a 3D display, which are modifiable from the above-described embodiment, will be described based on the 3D display 200 illustrated in FIG. 2. In addition, detailed descriptions of configurations, which are the same as the configurations described with reference to FIG. 2, of the 3D displays according to the embodiments will be omitted.

Figure 5:
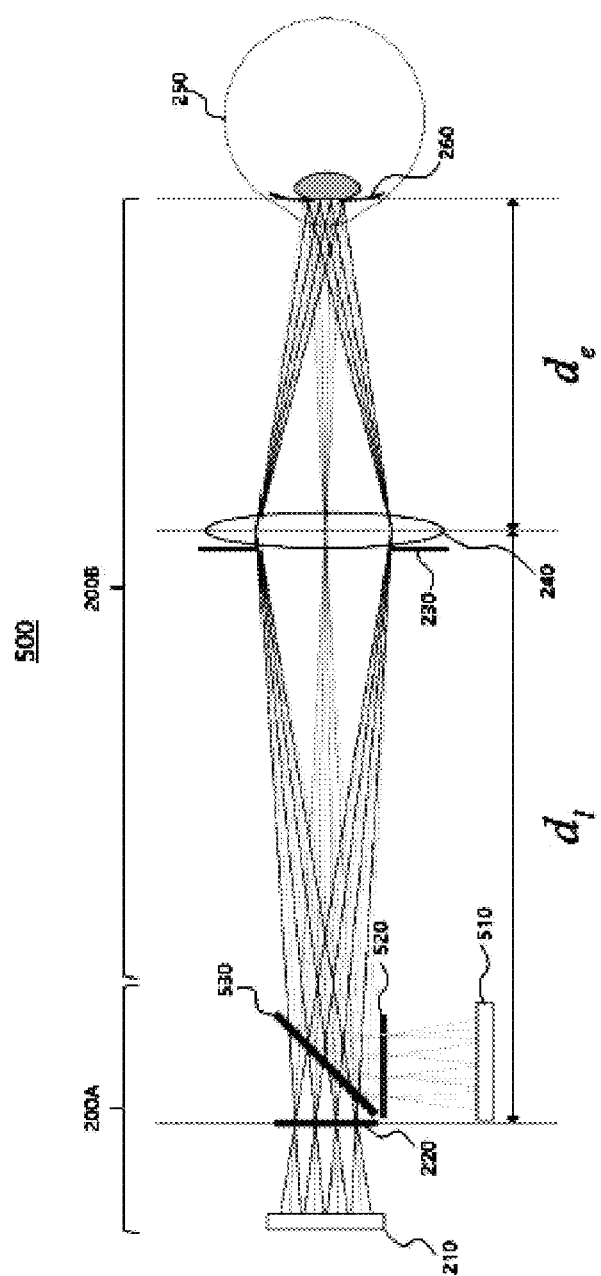
FIGS. 5 to 11 are configuration views illustrating 3D displays according to one embodiment of the present invention.

FIG. 5 is a configuration view illustrating a 3D display according to one embodiment of the present invention.

Referring to FIG. 5, a 3D display 500 includes a parallax image provider 200A configured to form two-dimensionally arranged parallax images spatially divided to provide at least two parallax images, and a parallax image convergence unit 200B configured to converge the two-dimensionally arranged parallax images provided by the parallax image provider 200A around a pupil 260 of an eyeball 250.

Preferably, the parallax image provider 200A may include an additional image providing unit 510 configured to provide at least two parallax images, an additional optical device array 520 configured to spatially divide the parallax images provided by the additional image providing unit 510 to form the two-dimensionally arranged parallax images, and a half mirror 530 configured to combine the parallax images. Here, the additional optical device array 520 may include an additional pinhole array or additional lens array, and the descriptions of the pinhole array and the lens array may be the same as those of the additional pinhole array and the additional lens array.

More specifically, the half mirror 530 combines parallax images provided by an image providing unit 210 and formed through an optical device array 220 and parallax images provided by the additional image providing unit 510 and formed through the additional optical device array 520, and the number of views of the parallax images, which are converged around the pupil 260 of the eyeball 250, increases by parallax images combined by the half mirror 530. That is, according to the 3D display 500 according to the present invention, since images provided by the two different image providing units 210 and 510 and transmitted through the optical device arrays are combined by the half mirror 530 and converged around the pupil 260 of the eyeball 250, the number of views of the parallax images converged around the pupil 260 may increase. In addition, the arrangement of pinholes of a pinhole array of the optical device array may expand without pinholes overlapping in a vertical or horizontal direction. In this case, an effect like two displays having the same structure and being disposed in parallel may be obtained by combining images displayed through the half mirror 530.

Figure 6:
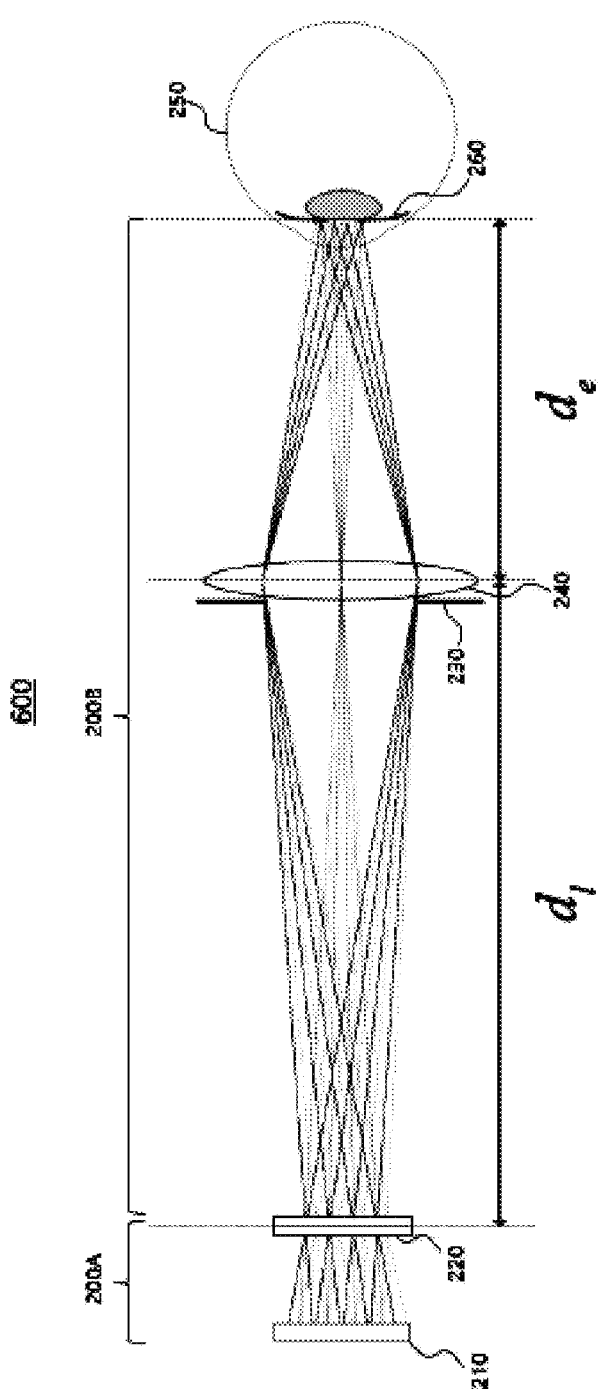

FIG. 6 is a configuration view illustrating a 3D display according to one embodiment of the present invention.

Referring to FIG. 6, a 3D display 600 includes a parallax image provider 200A configured to form two-dimensionally arranged parallax images spatially divided to provide at least two parallax images, and a parallax image convergence unit 200B configured to converge the two-dimensionally arranged parallax images provided by the parallax image provider 200A around a pupil 260 of an eyeball 250.

Figure 7:
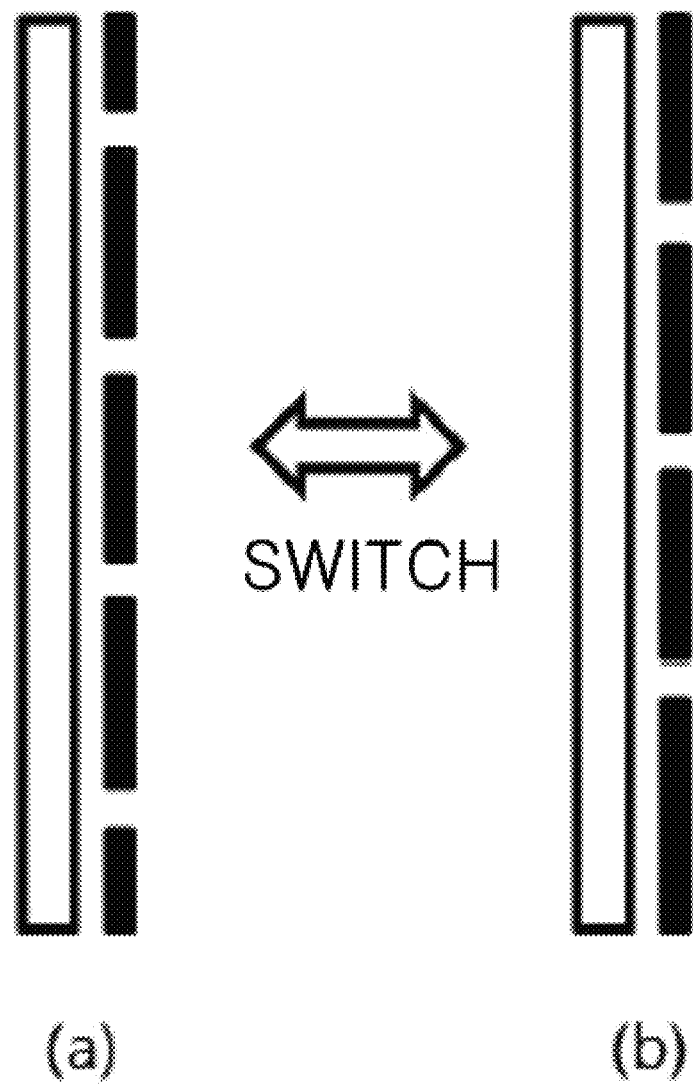

Preferably, the parallax image provider 200A may include an optical device array 220 for dividing parallax images provided by the image providing unit 210 over time. Here, the optical device array 220 may include two or more pinhole arrays, and the two or more pinhole arrays increase the number of views of the parallax images converged around the pupil 260 of the eyeball 250 by changing positions of the pinholes over time as illustrated in FIG. 7. More specifically, two pinhole arrays may be alternately applied to one image providing unit 210 when two or more pinhole arrays are used, and as illustrated in FIGS. 7A and 7B, pinholes of two pinhole arrays may be dynamically adjusted to change states of the pinhole arrays over time such that two pinhole arrays alternately serve as pinholes or to block light. Although only two pinhole arrays are illustrated in FIG. 7, three or more pinhole arrays may be used to change states of the pinhole arrays over time, and lens arrays may also be applied instead of the pinhole arrays.

As described above, according to the 3D display 600 according to the present invention, there is an effect in that the number of views of parallax images formed around the pupil 260 of the eyeball 250 increases without reducing spatial resolution of the images by changing positions of the pinholes overtime using the optical device array 220 including two or more pinhole arrays. In addition, since the number of views per unit area increases, a 3D sensation of a 3D image can be improved, that is, a natural change in focus can be improved, and since a display area allocated to one pinhole of the pinhole array expands twofold, resolution of the parallax images can be improved.

Accordingly, according to the present invention, since a 3D effect the same as that of a conventional method may be expressed by using only half of the number of the pinholes when compared with the case of 3D display which does not use time division, a distance between the pinholes is two times that of a conventional method, and which means that an allocated display area may be twofold.

Figure 8:
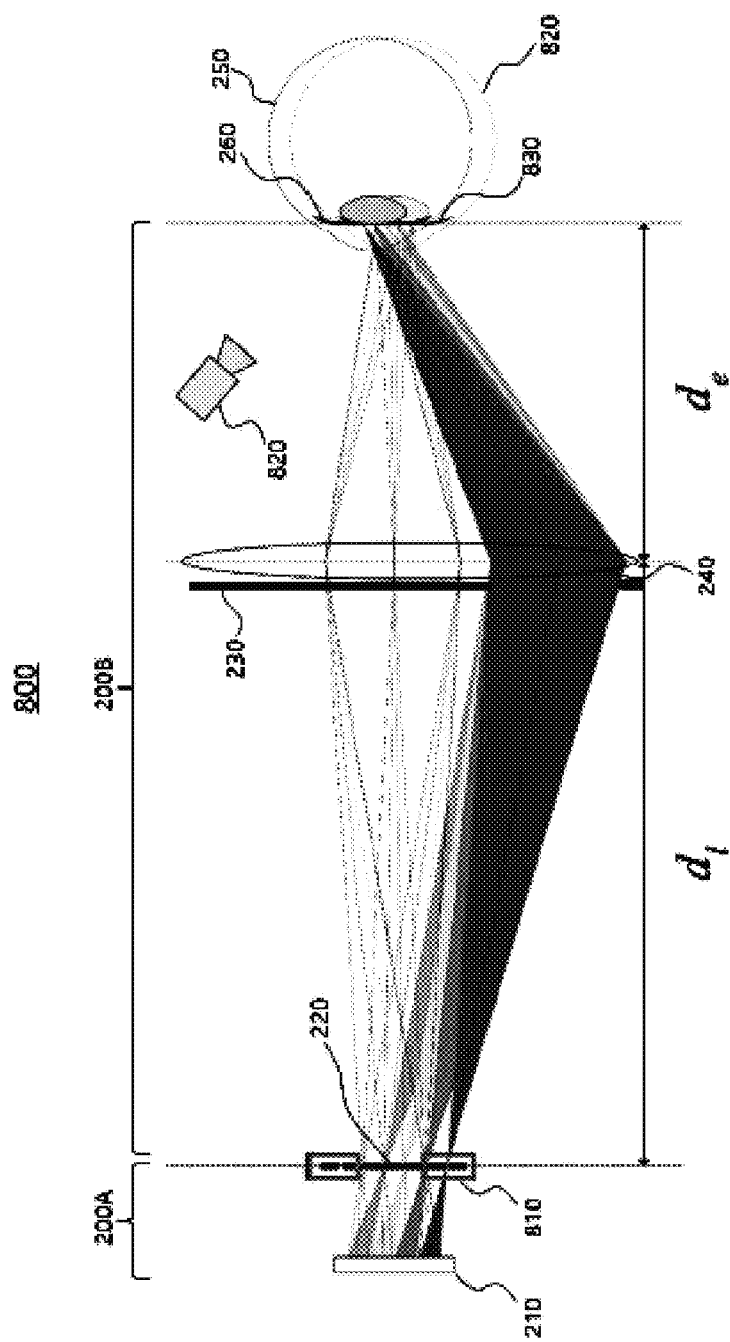

FIG. 8 is a configuration view illustrating a 3D display according to one embodiment of the present invention.

Referring to FIG. 8, a 3D display 800 includes a parallax image provider 200A configured to form two-dimensionally arranged parallax images spatially divided to provide at least two parallax images, and a parallax image convergence unit 200B configured to converge the two-dimensionally arranged parallax images provided by the parallax image provider 200A around a pupil 260 of an eyeball 250.

Preferably, an optical device array 220, which is formed to be greater than parallax images provided by an image providing unit 210, may be formed in the parallax image provider 200A, and the parallax image convergence unit 200B may further include a pupil position tracing sensor 820 for detecting a position of a pupil of the eyeball 250. Here, the pupil position tracing sensor 820 may be used to correct or align observed images with the eyeball 250 according to a personal state by detecting a position of the eyeball 250 to detect the position of and a distance to the pupil and a change in position of the eyeball 250 according to a state in which the 3D display 800 is worn. In addition, the pinhole array is formed to correspond one-to-one to parallax images provided by the image providing unit 210 in a case in which the optical device array 220 includes a pinhole array, but the number of pinhole arrays may be more than the number of parallax images provided by the image providing unit 210 in the 3D display 800 illustrated in FIG. 8.

More specifically, according to the 3D display 800 illustrated in FIG. 8, when the pupil position tracing sensor 820 detects a change in position of the eyeball from a position 250 to a position 820, and the pupil of the eyeball around which parallax images are converged is changed to a position 830 from a position 260, the parallax images may be converged around the pupil 630 of the eyeball changed through a portion 810 formed to extend from the optical device array 220 formed to correspond one-to-one to the parallax images provided by the image providing unit 210 so as to expand the parallax images through a sub-viewing zone. That is, although images provided by the image providing unit 210 correspond one-to-one to pinholes of the pinhole array in the case in which the optical device array 220 includes the pinhole array, in a case in which images are observed though added pinholes in the portion 810, there is an effect in that a sight expands like a purple portion, which is referred to as the sub-viewing zone, in FIG. 8. Whether the sub-viewing zone is used is determined according to a position of the pupil detected by the pupil position tracing sensor 820, and in a case in which the sub-viewing zone is used, images have to be changed to images corresponding to a position of the sub-viewing zone. That is, when the pupil position tracing sensor 820 detects that a position of the pupil is out of a main-viewing zone illustrated in FIG. 2, the sub-viewing zone is used. Here, according to the 3D display 800, displayed images are changed to images corresponding to parallax seen from the position of the sub-viewing zone.

Figure 9:
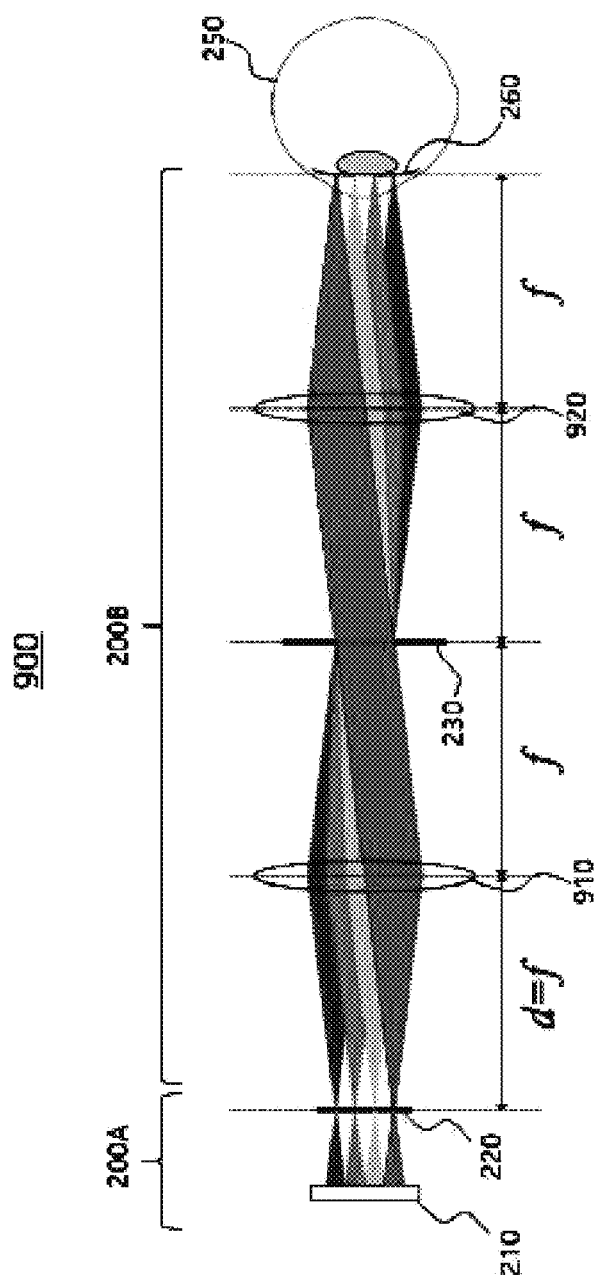

FIG. 9 is a configuration view illustrating a 3D display according to one embodiment of the present invention.

Referring to FIG. 9, a 3D display 900 includes a parallax image provider 200A configured to form two-dimensionally arranged parallax images spatially divided to provide at least two parallax images, and a parallax image convergence unit 200B configured to converge the two-dimensionally arranged parallax images provided by the parallax image provider 200A around a pupil 260 of an eyeball 250.

Preferably, a symmetric optical system, in which a distance between an optical device array 220 and a convex lens is a focal distance such that parallax images transmitted through the optical device array 220 are directly projected on the eyeball, that is, images that are the same as the parallax images transmitted through the optical device array 220 are converged around an pupil 260 of the eyeball 250, may be used as the parallax image convergence unit 200B. That is, in a case in which the images are directly projected on the eyeball 250, since a change in image due to a change in eye lens (that is, blurriness due to a change in focus) is minimized, the symmetric optical system is used in the 3D display 900 illustrated in FIG. 9 to provide images suitable to adjust a focus utilizing only a change in parallax.

More specifically, the parallax image convergence unit 200B may include a first convex lens 910 disposed at a position spaced a focal distance of the first convex lens 910 from an optical device array 220, a sight adjustment opening 230 disposed at a position spaced the focal distance from the first convex lens 910, and a second convex lens 920 disposed at a position spaced a focal distance of the second convex lens 920 from the sight adjustment opening 230. Here, the focal distance of the second convex lens 920 may be less than or equal to that of the first convex lens 910, the second convex lens 920 may be spaced the focal distance of the second convex lens 920 from the pupil 260 of the eyeball 250, and first and second spherical reflectors may also be used instead of the first and second convex lens 910 and 920.

Figure 10:
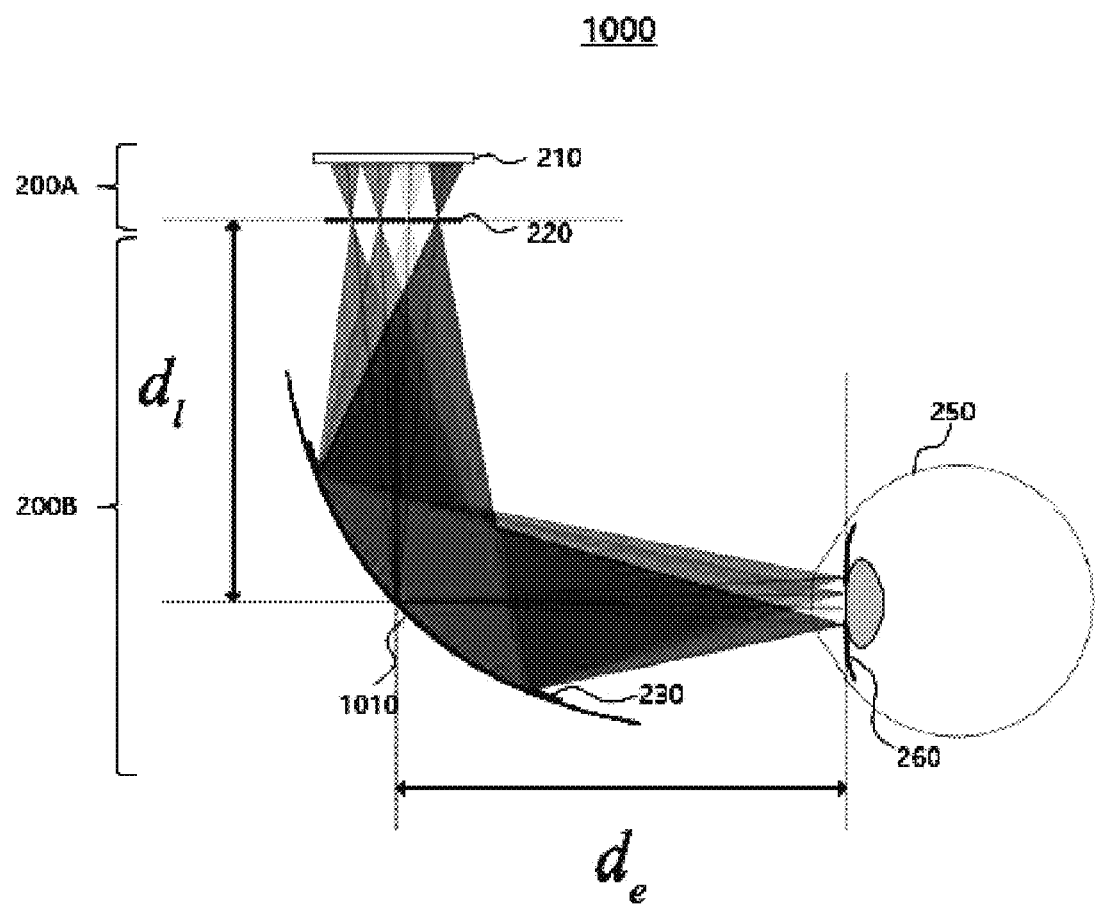

FIG. 10 is a configuration view illustrating a 3D display according to one embodiment of the present invention.

Referring to FIG. 10, a 3D display 1000 includes a parallax image provider 200A configured to form two-dimensionally arranged parallax images spatially divided to provide at least two parallax images, and a parallax image convergence unit 200B configured to converge the two-dimensionally arranged parallax images provided by the parallax image provider 200A around a pupil 260 of an eyeball 250.

Preferably, the parallax image convergence unit 200B may include a sight adjustment opening 230 configured to adjust a sight such that parallax images are converged around the pupil 260 of the eyeball 250, and a concave mirror 1010 configured to adjust a distance between the parallax images converged around the pupil 260 of the eyeball 250 within a diameter of a pupil. Here, a combination of a convex lens and a half mirror, or concave half mirror, that is, a translucent concave mirror, may be used instead of the concave mirror 1010 to simultaneously observe virtual and external images.

Preferably, in the case in which the 3D display 1000 includes the concave mirror 1010, as illustrated in the drawing, an image providing unit 210 and the eyeball 250 may be disposed at positions to maintain a predetermined angle to secure a sight. In the case of a system using a conventional lens, an image combining optical device such as a half mirror is required to implement an augmented reality, but according to the 3D display 1000 of the present invention, since the concave mirror may be manufactured to be translucent, a separate half mirror is not necessary. In addition, in a case in which the mirror and the lens have the same radius of curvature, since a focal distance (half of the radius of curvature) of the mirror is less than a focal distance (two times the radius of curvature) of the lens, a distance between the image providing unit 210 and a concave mirror 1010, and a distance between the concave mirror 1010 and the eyeball 250 may decrease.

Figure 11:
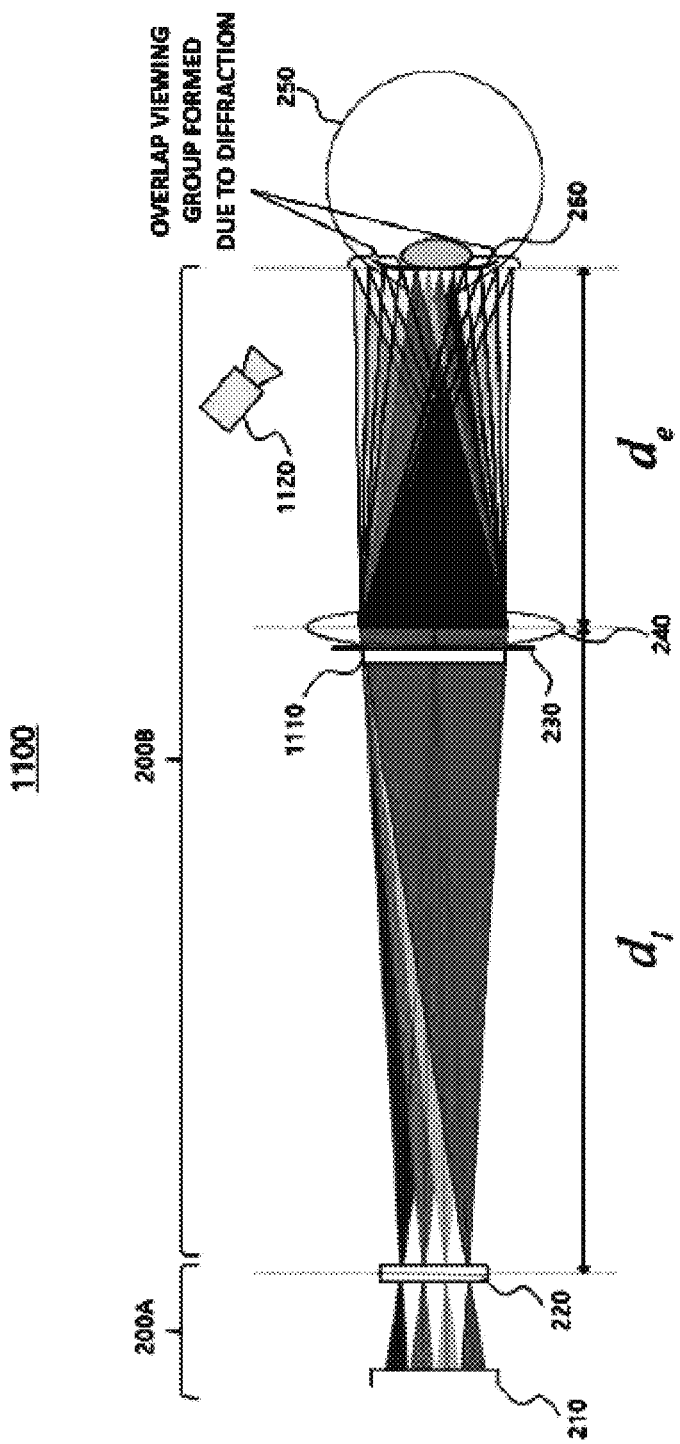

FIG. 11 is a configuration view illustrating a 3D display according to one embodiment of the present invention.

Referring to FIG. 11, a 3D display 1100 includes a parallax image provider 200A configured to form two-dimensionally arranged parallax images spatially divided to provide at least two parallax images, and a parallax image convergence unit 200B configured to converge the two-dimensionally arranged parallax images provided from the parallax image provider 200A around a pupil 260 of an eyeball 250.

Preferably, the parallax image convergence unit 200B may further include a diffraction optical device 1110 disposed in front of or behind a convex lens 240, and a pupil position tracing sensor 1120 for detecting a position of a pupil of the eyeball 250. Here, the diffraction optical device 1110 may be positioned in the middle of the group consisting of a plurality of convex lenses 240, and the diffraction optical device 1110, which expands the parallax images by diffracting the parallax images provided by an image providing unit 210 according to a position of the pupil of the eyeball 250 detected by the pupil position tracing sensor 1120, may correspond to, for example, a 2D grating or beam shaping device.

More specifically, in the 3D display 1100 illustrated in FIG. 11, since the diffraction optical device 1110 is provided in front of a sight adjustment opening 230 and the convex lens 240, an overlap viewing group is formed around a pupil due to a diffraction phenomenon caused by the diffraction optical device 1110, and thus the diffraction optical device 1110 may be considered to serve a role similar to that of a sub-viewing zone. Accordingly, since a main-viewing zone and a sub-viewing zone may be continuously connected, the expanded sub-viewing zone can be utilized according to a signal processing process. Here, a term of the zeroth degree which occurs due to diffraction caused by the diffraction optical device 1110 forms a view group at a position of the pupil, and each of terms of the first and negative first degrees forms a view group at a position spaced a diffracted angle from the position of the pupil, In addition, an angle at which diffraction occurs may be adjusted according to a size of the lattice of the diffraction optical device 1110. That is, according to the 3D display 1100 illustrated in FIG. 11, the pupil position tracing sensor 1120 detects that a position of the eyeball is changed and a position of the pupil is out of a main-viewing zone, the pupil position tracing sensor 1120 detects the position of the pupil, view images corresponding to a view group formed due to diffraction caused by the diffraction optical device 1110 are provided according to the detected position of the pupil, and thus an effect the same as expanding of a sight zone may be obtained.

In another embodiment of the present invention, the above-described full parallax multi-focus 3D display according to the various embodiments may be applied for both eyes of an observer. In a system in which only binocular parallax is provided, there are no major problems in providing a 3D sensation even in the binocular parallax is slightly off, but in the case in which the binocular parallax and parallax images for adjusting focuses are present like the present invention, binocular parallax images and parallax images for adjusting focuses have to be accurately the same to provide a 3D image at an accurate depth and a 3D sensation to the observer. In this case, the observer can be provided with full parallax images changed according to a focal position of the observer.

As described above, there are effects in that eye fatigue due to prolonged use of head mounted display (HMD) and discomfort in eye focusing capability can be solved, since focusing can be performed for an entire space, an observer can concentrate on an image like a real object when convergence depth is changed, and thus an existing inconvenience can be removed, and since full augmented reality and virtual reality can be realized, an effect the same as that of a hologram can be obtained.

In addition, there are effects in that a volume of a display according to the present invention can be reduced because a separate lens used in a projective optical device is not necessary, unlike existing methods, the display can be formed using a spatial division method even without using a time division method, and when the time division method or two image providing units are used, the number of views can increase additionally and resolution can be improved, or viewing zone can be expanded in a vertical or horizontal direction. In addition, there is an effect in that problems due to a position of an eyeball can be solved even without additional hardware through a method of tracing a position of an eyeball center using a 2D sub-viewing zone.

In addition, since an image is transmitted to a retina through a direct projection method, there are effects in that a restriction of depth expression range is not severe, resolution reduction due to expressed depth of a virtual object does not occur, and since a lighting optical system is not used, a system having a commercializable size can be realized.

That is, according to the present invention, since depth adjustment information can be provide to a single eye or both eyes, there is the same effect as that of a hologram, since the display can be formed by utilizing an existing geometrical optical system, there is an effect in that the display can be commercialized, and since an image of a 2D view can be formed through the spatial division method, there is an effect in that the system can be simplified and miniaturized.

While the exemplary embodiments of a 3D display according to the present invention have been described, the present invention is not limited thereto and may be variously modified and made within appended claims, the detailed description, and the accompanying drawings, and such modifications are also included in the present invention.

REFERENCE NUMERALS

100: EYEBALL
110 AND 120: POINT LIGHT SOURCE
112 AND 122: EYE LENS
130 AND 140: CONVERGENCE POSITION
200, 500, 600, 800, 900, 1000, 1100: THREE-DIMENSIONAL DISPLAY
200A: PARALLAX IMAGE PROVIDER
200B: PARALLAX IMAGE CONVERGENCE UNIT
210: IMAGE PROVIDING UNIT
220: OPTICAL DEVICE ARRAY
230: SIGHT ADJUSTMENT OPENING
240: CONVEX LENS
250: EYEBALL
260: AROUND PUPIL
510: ADDITIONAL IMAGE PROVIDING UNIT
520: ADDITIONAL OPTICAL DEVICE ARRAY
530: HALF MIRROR
820: PUPIL POSITION TRACING SENSOR
910: FIRST LENS
920: SECOND LENS
1010: CONCAVE MIRROR
1110: OPTICAL DEVICE ARRAY
1120: PUPIL POSITION TRACING SENSOR

What is claimed is:

1. A three-dimensional display comprising:
a parallax image provider configured to form two-dimensionally arranged parallax images spatially divided to provide at least two parallax images; and
a parallax image convergence unit configured to converge the two-dimensionally arranged parallax images provided by the parallax image provider around a pupil of an eyeball;
wherein the parallax image provider includes:
an image providing unit configured to provide the at least two parallax images; and
an optical device array configured to spatially divide the parallax images provided by the image providing unit to form two-dimensionally arranged parallax images;
wherein the optical device array includes a pinhole array which is two-dimensionally arrayed, a lens array which is two-dimensionally arrayed, or a combination of the pinhole array and the lens array, and
wherein the parallax images provided by the image providing unit correspond one-to-one to pinholes of the pinhole array or lenses of the lens array.

2. The three-dimensional display of claim 1, wherein the parallax image provider further includes:
an additional image providing unit configured to provide the at least two parallax images;
an additional optical device array arrayed two-dimensionally and configured to spatially divide the parallax images provided by the additional image providing unit to form two-dimensionally arranged parallax images; and
a half mirror configured to combine the parallax images provided by the image providing unit and formed through the optical device array and the parallax images provided by the additional image providing unit and formed through the additional optical device array,
wherein, the number of views of the parallax images, which are converged around the pupil of the eyeball, increases by parallax images combined by the half mirror.

3. The three-dimensional display of claim 1, wherein the parallax image provider includes the optical device array having two or more pinhole arrays to spatially divide the parallax images provided by the image providing unit,
wherein positions of the pinholes change over time using the two or more pinhole arrays to increase the number of views of the parallax images converged around the pupil of the eyeball.

4. The three-dimensional display of claim 1, wherein, in the parallax image provider, the optical device array is formed to be greater than the parallax images provided by the image providing unit to expand the parallax images transmitted through a sub-viewing zone according to a position of the pupil of the eyeball detected by a pupil position tracing sensor configured to detect the position of the pupil of the eyeball.

5. The three-dimensional display of claim 1, wherein the pinhole of the pinhole array forms a two-dimensional image of one view and a diameter of the pinhole is 0.05 mm or more.

6. The three-dimensional display of claim 1, wherein the image providing unit includes a self-luminous display panel corresponding to an organic light-emitting diode (OLED) or micro light-emitting diode (LED), or a passive display panel corresponding to a liquid crystal display (LCD), a liquid crystal on silicon (LCoS), or a digital micro-mirror device (DMD).

7. The three-dimensional display of claim 1, wherein the parallax image convergence unit includes:
   a sight adjustment opening configured to adjust a sight such that the parallax images are converged around the pupil of the eyeball; and
   a convex lens configured to adjust a distance between the parallax images converged around the pupil of the eyeball.

8. The three-dimensional display of claim 7, wherein the parallax image provider includes:
   a pupil position tracing sensor configured to detect a position of the pupil of the eyeball; and
   a diffraction optical device disposed in front of the convex lens and configured to diffract the parallax images provided by the image providing unit according to the position of the pupil of the eyeball detected by the pupil position tracing sensor to expand the parallax images.

9. The three-dimensional display of claim 7, wherein, in the optical device array, a distance between unit optical devices, a distance between the image providing unit and the convex lens, and a distance between the convex lens and the eyeball are adjusted such that a distance between views formed around the pupil is less than a diameter of the pupil.

10. The three-dimensional display of claim 1, wherein the parallax image convergence unit includes a first convex lens, a sight adjustment opening, and a second convex lens, which are sequentially disposed such that the parallax images transmitted through the optical device array are directly projected on the eyeball and distances between the first convex lens, the sight adjustment opening, and the second convex lens correspond to focal distances of the first and second convex lenses.

11. The three-dimensional display of claim 1, wherein the parallax image convergence unit includes: a sight adjustment opening configured to adjust a sight to converge the parallax images around the pupil of the eyeball; and a concave or translucent concave mirror configured to adjust a distance between the parallax images converged around the pupil of the eyeball.

* * * * *